UNITED STATES PATENT OFFICE.

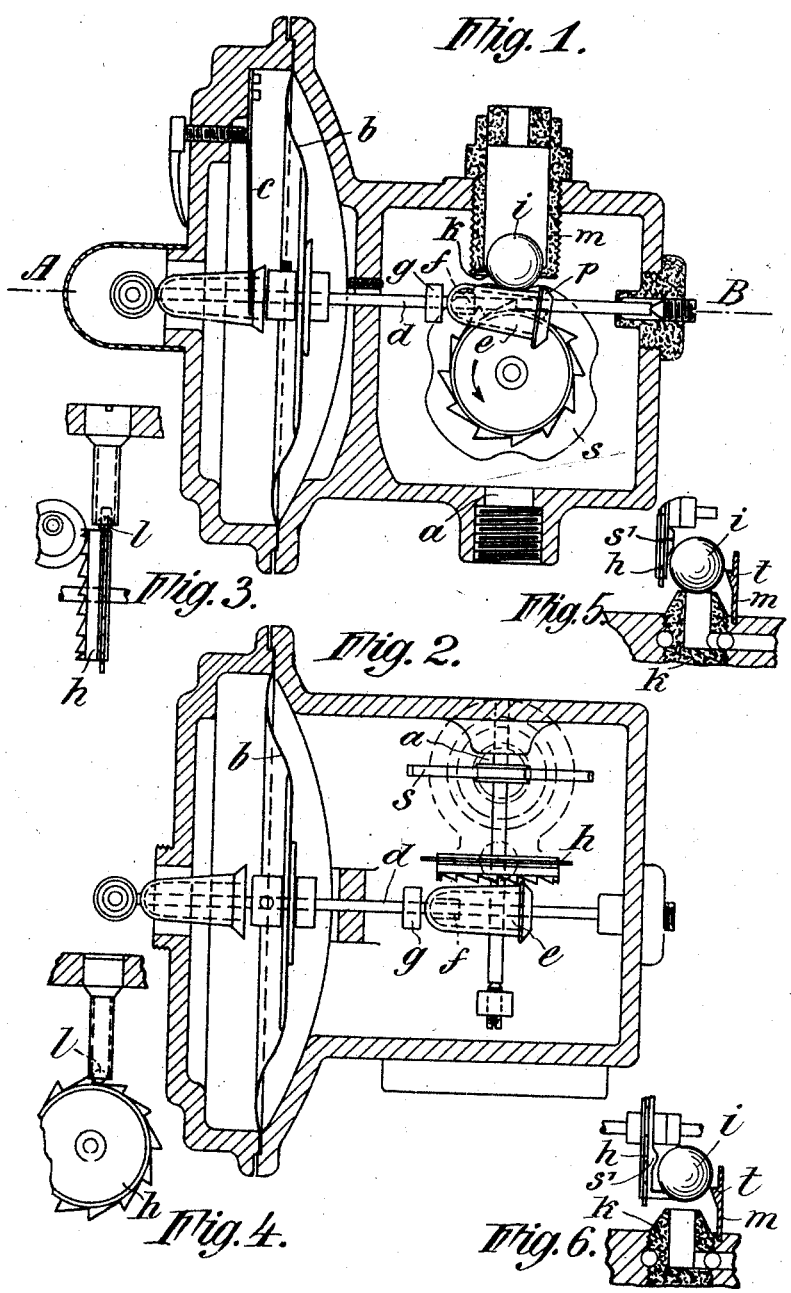

EDUARD KÖRNER, OF LÜTZEL, NEAR KOBLENZ, GERMANY.

APPARATUS FOR CONTROLLING THE LIGHTING OF GAS FROM A DISTANCE.

1,025,750. Specification of Letters Patent. Patented May 7, 1912.

Application filed July 18, 1911. Serial No. 639,132.

*To all whom it may concern:*

Be it known that I, EDUARD KÖRNER, a subject of the German Emperor, residing at Blumenstrasse 1, Lützel, near Koblenz, Germany, have invented certain new and useful Improvements in Apparatus for Controlling the Lighting of Gas from a Distance, of which the following is a specification.

This invention relates to apparatus for controlling the lighting of gas from a distance.

In similar apparatus as heretofore constructed the transmission of the impact, through the diaphragm or plunger bell to the control wheel, was effected by pawl and ratchet mechanism of ordinary construction. In practice it was found that these parts often failed to act owing to impurities in the gas or rust from the pipes, causing them to become clogged and to become displaced readily, resulting in derangement.

In the apparatus according to the present invention, the control ratchet is constructed as a rotating body pivoted on the diaphragm spindle and has, with regard to this latter, both a rotary movement and a pendulous movement corresponding to the depth of the ratchet tooth. In this way advantages in several respects are secured. In the first place the effect of wear of the engaging surfaces of the controlling pawl is practically eliminated because this pawl automatically rotates to a small extent around its spindle at each operation of the mechanism, and can if desired be readily turned by hand, so that new parts of the engaging surface can be brought into operative contact with the ratchet wheel. On the other hand, this design of the controlling organ insures a very easy operation of the controlling mechanism, because the capacity for rotation of the pawl around its longitudinal axis allows for the changes of the effective leverage resulting during the gradual ascent of the tooth at the time engaged, which might otherwise cause undue friction and possibly jamming between the pawl and ratchet wheel.

In the accompanying drawing two modifications of the invention are illustrated.

Figure 1 is a vertical section through apparatus specially intended for upright burners, the control mechanism being shown in elevation. Fig. 2 is a section taken on the line A—B of Fig. 1. Figs. 3 and 4 show the pawl and ratchet device in side and front view, and Figs. 5 and 6 show a valve arrangement for inverted burners, respectively with the valve closed and opened.

The gas enters through the channel $a$ into the casing 1 and to the rear of the diaphragm $b$, which is balanced by an adjustable blade spring $c$. The latter may be replaced by an adjustable counterweight. A spindle $d$ is attached to the diaphragm $b$, its ends being guided in suitable guides of the casing 1, so that defective working owing to the spindle shifting laterally cannot take place. On the spindle $d$ is a hollow conical pawl $e$ rotatable about its longitudinal axis and in longitudinal section on each side of its axis takes the shape of a pawl, *i. e.*, the cone is provided at its base with a small annular lip or rim $p$ which serves as a pawl tooth. This pawl $e$ is prevented from moving axially on the spindle $d$, toward the right by a collar $f$, and toward the left by a collar $g$. In addition to the above mentioned rotating movement the pawl $e$ has a pendulous motion similar to that of a bell. This latter motion enables the pawl as required to swing sidewise to the extent of the depth of the corresponding teeth of the ratchet wheel, while the rotary movement serves to minimize the results of wear and bring about a free and frictionless action of the control mechanism. The ratchet wheel $h$ which works in conjunction with the pawl $e$ is provided with two different sets of teeth, namely on the front (Fig. 1) side-ratchet or "crown" tee' with which the pawl $e$ engages with its annular lip $p$, and other teeth on the periphery of the ratchet wheel which serve to prevent backward rotation of the wheel $h$, by means of the rising and falling ball $l$ (Figs. 3 and 4), which is somewhat smaller in radius than the depth of each of the teeth with which it engages. The ball valve $i$ is located in a bore of the casing $m$ on the valve seat $k$; it is actuated by the cam wheel $s$ by means of gently rising cams thereon.

The apparatus works in the following way. If a pressure impact or augmentation takes place, the diaphragm $b$ moves to the left, as in Figs. 1 and 2. The collar $f$ of the spindle $d$ then carries with it the pawl $e$, so that, owing to the engagement of the lip $p$ with the crown teeth (Fig. 1) of the ratchet wheel, the latter is turned to the extent of one tooth in the direction of the arrow of Fig. 1. The falling ball $l$ then engages with the oblique surface of the particular ratchet tooth then passing beneath it, and on completion of the stroke of the pawl, drops behind that tooth into the next succeeding tooth gap. At the same time one of the cams of the wheel $s$ lifts the ball valve $i$ off its seat $k$. This lifting however takes place very gently because, deviating from known designs, it is assisted by the gas pressure. During the stroke of the pawl the latter is free to adjust itself automatically and correctly owing to its rotating and swinging movement, so that a gentle, free and frictionless motion of the control mechanism takes place. When the pressure impact or augmentation stops, the diaphragm $b$ with the spindle $d$ returns rightward to normal position. The pawl $e$ is then carried along by the collar $g$. Owing to its pendulous suspension, the pawl, with its lips $p$ rises during the return motion out of the corresponding crown tooth, the ratchet wheel $h$ meanwhile remaining stationary, because the ball $l$ prevents the backward rotation of the mechanism.

While Figs. 1 to 4 show the apparatus in the form suitable for upright burners, Figs. 5 and 6 show it in the form suitable for inverted burners. In the last mentioned arrangement the ball valve $i$, as is customary in such construction, rests on a valve seat $k$ made as a separate body, and is located inside a valve seat body $m$. The ball $i$ is controlled by gently rising teeth $s'$, which project sidewise on the ratchet wheel $h$. On the valve seat body $m$ a projecting rib $t$ is provided. When the ratchet wheel $h$ turns about its axis, each tooth $s'$ tilts the ball $i$ over the tipping edge $t$ after the manner of a one-arm lever, which can be done with a slight expenditure of energy, and it is then suspended in the way seen in Fig. 6, away from the valve seat $k$.

What I claim and desire to secure by Letters Patent of the United States is:—

1. A device for controlling the lighting of gas from a distance comprising the combination of a member sensitive to pressure with a pawl adapted to be moved longitudinally by the said member, means for supporting the pawl, the pawl being rotatable on the said means and also partaking of a pendulous motion, the extent of which is determined by the depth of ratchet-teeth with which it is adapted to engage.

2. A device for controlling the lighting of gas from a distance comprising the combination of a member sensitive to pressure with a pawl movable longitudinally by the said member, means for supporting the pawl, the pawl being rotatable on the said means whereby it may be turned about its longitudinal axis, the pawl also being capable of a pendulous motion, the extent of which depends upon the depth of the ratchet teeth with which it is adapted to engage, the said supporting means comprising a collar which forms a ball pivot about which the said pawl moves.

3. A device for controlling the lighting of gas from a distance comprising the combination of a member sensitive to pressure with a pawl movable longitudinally by the said member, means for supporting the said pawl, the pawl being rotatable on the said means, a ratchet wheel actuated by the movement of said pawl, a ball having free play and serving as a detent for the ratchet wheel the radius of said ball being less than the depth of the teeth of the ratchet wheel with which it engages.

4. A device for controlling the lighting of gas from a distance comprising the combination of a member sensitive to pressure, a pawl and ratchet wheel device acted upon by said first mentioned member, and a detent for the ratchet wheel consisting of a ball having free vertical play, the radius of said ball being less than the depth to which the ball enters in the teeth of the ratchet wheel.

5. A device of the class described comprising a chamber having a diaphragm therein, an opening whereby gas may enter the chamber, a cam wheel rotatably mounted within the chamber, a ball valve suitably positioned within a casing and free to turn in all directions, the ball valve being in engagement with the said cam wheel, and means connected to the diaphragm and in engagement with other means connected to the cam wheel whereby, as such diaphragm is moved, the cam wheel will be operated and the ball valve thereby turned by the cam wheel and lifted vertically so that it is held suspended over its seat.

In testimony whereof I affix my signature in presence of two witnesses.

EDUARD KÖRNER.

Witnesses:
PAUL ARRAS,
CLÄRE SIMON.